United States Patent
McCullough

(10) Patent No.: US 10,479,846 B2
(45) Date of Patent: Nov. 19, 2019

(54) HAFNOCENE CATALYST COMPOUNDS AND PROCESS FOR USE THEREOF

(71) Applicant: ExxonMobil Chemical Patents Inc., Baytown, TX (US)

(72) Inventor: Laughlin G. McCullough, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 144 days.

(21) Appl. No.: 15/852,553

(22) Filed: Dec. 22, 2017

(65) Prior Publication Data

US 2018/0237558 A1 Aug. 23, 2018

Related U.S. Application Data

(60) Provisional application No. 62/461,113, filed on Feb. 20, 2017.

(51) Int. Cl.
| | |
|---|---|
| *C08F 10/02* | (2006.01) |
| *C08F 210/16* | (2006.01) |
| *C08F 4/65* | (2006.01) |
| *C08F 4/659* | (2006.01) |

(52) U.S. Cl.
CPC ............ *C08F 10/02* (2013.01); *C08F 210/16* (2013.01); *C08F 4/65908* (2013.01); *C08F 4/65912* (2013.01); *C08F 4/65916* (2013.01); *C08F 2420/01* (2013.01)

(58) Field of Classification Search
CPC .... C08F 10/02; C08F 210/16; C08F 2420/01; C08F 4/65908; C08F 4/65912; C08F 4/65916
USPC .......................................................... 526/64
See application file for complete search history.

(56) References Cited

U.S. PATENT DOCUMENTS

| | | | | |
|---|---|---|---|---|
| 6,469,113 | B1 * | 10/2002 | Lee ......................... | C07F 17/00 |
| | | | | 526/126 |
| 7,179,876 | B2 | 2/2007 | Szul et al. | |
| 7,829,495 | B2 | 11/2010 | Floyd et al. | |
| 9,422,380 | B2 * | 8/2016 | Nagy ..................... | C08F 210/16 |
| 2004/0043893 | A1 * | 3/2004 | Laughlin .............. | B01J 31/2295 |
| | | | | 502/117 |
| 2004/0092387 | A1 | 5/2004 | Matsunaga | |
| 2005/0085600 | A1 | 4/2005 | Ehrman et al. | |
| 2006/0247396 | A1 | 11/2006 | Blackmon et al. | |
| 2015/0284489 | A1 * | 10/2015 | Nagy ..................... | C08F 210/16 |
| | | | | 526/127 |

OTHER PUBLICATIONS

Vecers et al. "Group 4 Metal Complexes of Chelating Cyclopentadienyl-ketimide Ligands", Organometallics, 2016, vol. 35, No. 5, pp. 785-798 (Year: 2016).*
Siedle et al., "Stereochemical Nonrigidity in Metallocenium Ions", Journal of Organometallic Chemistry, 1995, vol. 497, No. 1-2, pp. 119-125.
Eisch et al., "Active sites for ethylene polymerization with titanium(IV) catalysts in homogeneous media: multinuclear NMR study of ion-pair equilibria and their relation to catalyst activity", Organometallics, 1993, vol. 12, No. 10, pp. 3856-3863.
Vecera et al., "Group 4 Metal Complexes of Chelating Cyclopentadienyl-ketimide Ligands", Organometallics, 2016, vol. 35, No. 5, pp. 785-798.
Leino et al., "Syndiospecific Propylene Polymerization with C1 Symmetric Group 4 ansa-Metallocene Catalyst," Macromolecules, 2001, vol. 34, No. 7, pp. 2072-2082.

* cited by examiner

*Primary Examiner* — Michael Bernshteyn

(57) ABSTRACT

This invention relates to hafnium metallocene compounds having a group substituted (preferably at the 3 position) on at least one cyclopentadienyl ring represented by the formula —$R^{20}$—$SiR'_3$ or —$R^{20}$—$CR'_3$ where $R^{20}$ is a $C_1$ to $C_4$ hydrocarbyl (preferably methyl) and R' is a $C_1$ to $C_{20}$ substituted or unsubstituted hydrocarbyl.

33 Claims, 1 Drawing Sheet

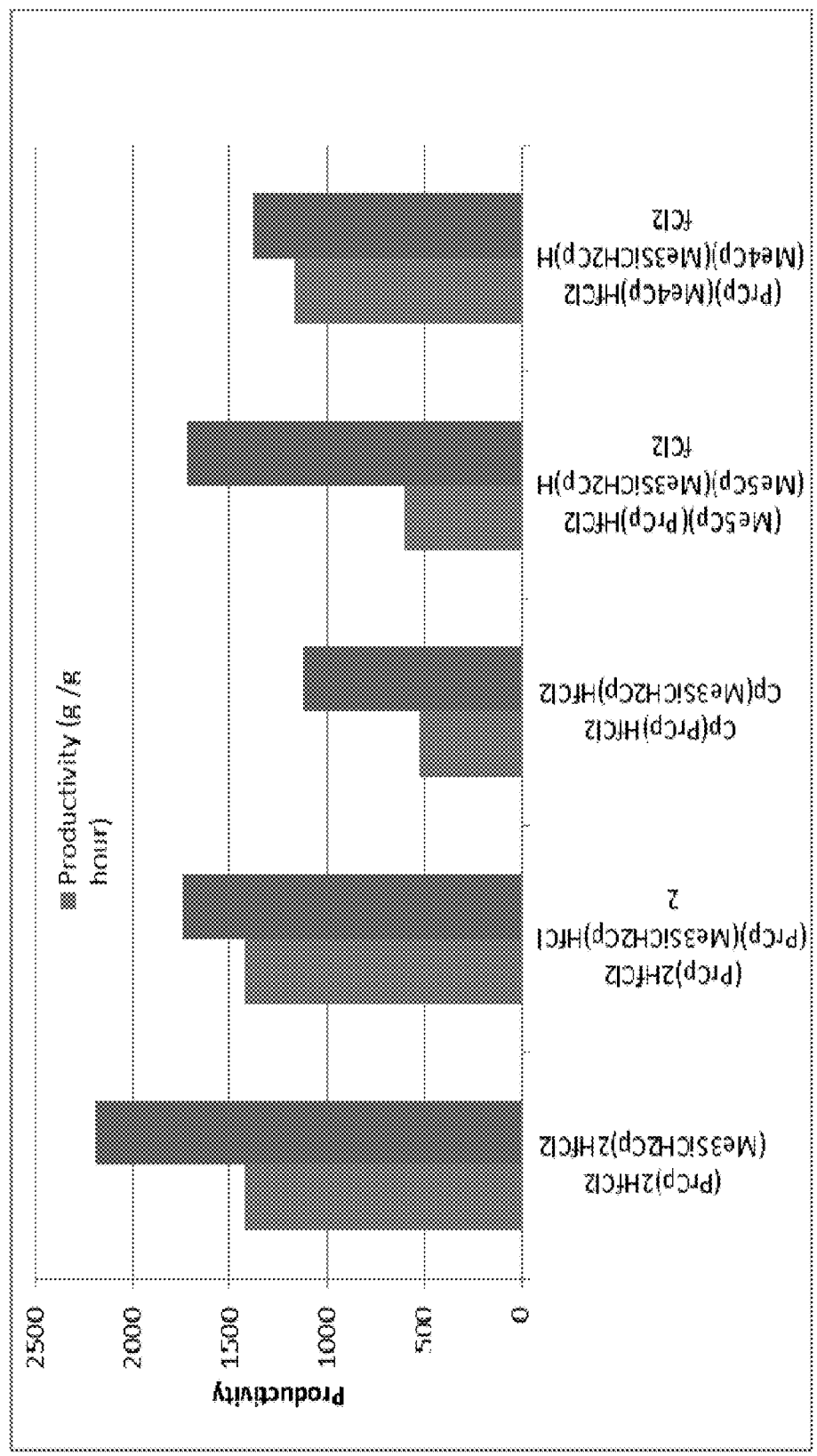

HAFNOCENE CATALYST COMPOUNDS AND PROCESS FOR USE THEREOF

PRIORITY CLAIM

This application claims priority to and benefit of U.S. Ser. No. 62/461,113, filed Feb. 20, 2017 and is incorporated by reference in its entirety.

FIELD OF THE INVENTION

This invention relates to novel hafnocene catalyst compounds, catalyst systems comprising such, and uses thereof.

BACKGROUND OF THE INVENTION

Olefin polymerization catalysts are of great use in industry. Hence there is interest in finding new catalyst systems that increase the commercial usefulness of the catalyst and allow the production of polymers having improved properties.

Catalysts for olefin polymerization are often based on substituted metallocenes as catalyst precursors, which are activated either with the help of an alumoxane, or with an activator containing a non-coordinating anion.

For example, U.S. Pat. No. 7,829,495 discloses $Me_2Si$(fluorenyl)(3-nPr-Cp)$ZrCl_2$ and U.S. Pat. No. 7,179,876 discloses supported (nPrCp)$_2$HfMe$_2$.

US 2004/0043893 discloses bis(trimethylsilylmethylcyclopentadienyl)hafnium diflouride at page 14, paragraph [0349], see also U.S. Pat. No. 7,910,764 and US 2004/0092387. US 2006/0247396 discloses bis[2-trimethylsilylethylcyclopentadienyl]hafniumA, at page 5, paragraph [0122].

Additionally, $Me_2C(Cp)(Me_3SiCH_2$-Ind)$MCl_2$ and $Me_2C(Cp)(Me, Me_3SiCH_2$-Ind)$MCl_2$, where M is Zr or Hf have been synthesized and screened for the syndiospecific polymerization of propylene; see Leino, R., Gomez, F.; Cole, A.; Waymouth, R. *Macromolecules*, 2001, 34, 2072-2082.

There is still a need in the art for new and improved catalyst systems for the polymerization of olefins, in order to achieve specific polymer properties, such as high melting point, high molecular weights, to increase conversion or comonomer incorporation, or to alter comonomer distribution without deteriorating the resulting polymer's properties.

Further is a need in the art for new and improved catalyst systems for the polymerization of olefins, in order to achieve high activity in the absence of fluorine while achieving good polymer properties, such as high melting point, high molecular weights, increased conversion or comonomer incorporation, or to alter comonomer distribution without deteriorating the resulting polymer's properties.

It is therefore an object of the present invention to novel catalyst compounds, catalysts systems comprising such compounds, and processes for the polymerization of olefins using such compounds and systems.

SUMMARY OF THE INVENTION

This invention relates to catalyst compounds represented by the formula (B), and catalyst systems comprising: activator, catalyst compound, and optional support wherein the catalyst compound is represented by the formula (B):

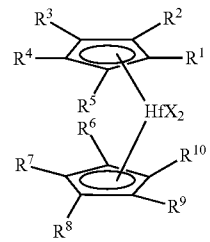

where:
each $R^1$, $R^2$, $R^3$, $R^4$, $R^5$, $R^6$, $R^7$, $R^8$, $R^9$ and $R^{10}$ is, independently, hydrogen, alkoxide, a $C_1$ to $C_{40}$ substituted or unsubstituted hydrocarbyl group or is $-R^{20}$-ER'$_3$, where E is a group 14 element (C, Si, Ge, or Sn), $R^{20}$ is a $C_1$ to $C_4$ hydrocarbyl (preferably methyl), and each R' is independently a $C_1$ to $C_{20}$ substituted or unsubstituted hydrocarbyl, provided that at least one R' is not H, and provided that at least one of $R^1$, $R^2$, $R^3$, $R^4$, $R^5$, $R^6$, $R^7$, $R^8$, $R^9$ and $R^{10}$ is $-R^{20}$-ER'$_3$; and each X is, independently, a univalent anionic ligand, or two X are joined and bound to the metal atom to form a metallocycle ring, or two X are joined to form a chelating ligand, a diene ligand, or an alkylidene ligand, where X is preferably not F.

This invention further relates to hafnium metallocene compounds represented by the formula (B):

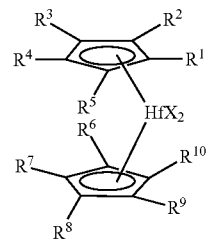

where:
each $R^1$, $R^2$, $R^4$ and $R^5$ is independently hydrogen, alkoxide or a $C_1$ to $C_{40}$ substituted or unsubstituted hydrocarbyl group;

$R^3$ is independently hydrogen, alkoxide or a $C_1$ to $C_{40}$ substituted or unsubstituted hydrocarbyl group or is $-R^{20}$-ER'$_3$, where E is a group 14 element (C, Si, Ge, or Sn), $R^{20}$ is a $C_1$ to $C_4$ hydrocarbyl (preferably methyl), and each R' is independently a $C_1$ to $C_{20}$ substituted or unsubstituted hydrocarbyl, provided that at least one R' is not H;

each $R^6$, $R^7$, $R^8$, and $R^{10}$ is independently hydrogen, alkoxide or a $C_1$ to $C_{40}$ substituted or unsubstituted hydrocarbyl group;

$R^9$ is $-R^{20}$-ER'$_3$, where E is a group 14 element (C, Si, Ge, or Sn), $R^{20}$ is a $C_1$ to $C_4$ hydrocarbyl (preferably methyl), and each R' is independently a $C_1$ to $C_{20}$ substituted or unsubstituted hydrocarbyl, provided that at least one R' is not H; and each X is, independently, a univalent anionic ligand, or two X are joined and bound to the metal atom to form a metallocycle ring, or two X are joined to form a chelating ligand, a diene ligand, or an alkylidene ligand, where X is preferably not F.

This invention also relates to catalyst systems comprising activator, a catalyst compound described above, and optional support.

This invention also relates to a method to polymerize olefins comprising contacting the catalyst system described above with one or more monomers.

This invention also relates to a method to polymerize olefins in the absence of fluorine comprising contacting the catalyst system described above with one or more monomers, where X is not F.

This invention further relates to polymer compositions produced by the methods described herein, said polymer preferably containing less than 100 ppm of fluorine, preferably less than 50 ppm fluorine, preferably less than 20 ppm of fluorine, preferably less than 10 ppm of fluorine.

BRIEF DESCRIPTION OF THE FIGURE

The FIGURE is a chart of catalyst productivity for Complexes 1 to 5.

DETAILED DESCRIPTION OF THE INVENTION

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, a pre-catalyst compound, catalyst compound, a complex, transition metal complex, or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion.

For purposes of this invention and claims thereto in relation to catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one functional group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

An "anionic ligand" is a negatively charged ligand which donates one or more pairs of electrons to a metal ion. A "neutral donor ligand" is a neutrally charged ligand which donates one or more pairs of electrons to a metal ion.

The term "continuous" means a system that operates without interruption or cessation. For example, a continuous process to produce a polymer would be one where the reactants are continually introduced into one or more reactors and polymer product is continually withdrawn.

Catalyst Compounds

This invention relates to bridged hafnium metallocene compounds represented by the formula (B):

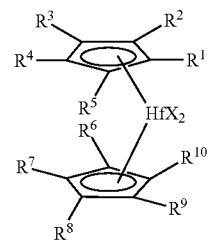

(B)

where:
each $R^1$, $R^2$, $R^3$, $R^4$, $R^5$, $R^6$, $R^7$, $R^8$, $R^9$ and $R^{10}$ is, independently, hydrogen, alkoxide, a $C_1$ to $C_{40}$ substituted or unsubstituted hydrocarbyl group or is $-R^{20}-ER'_3$, where E is a group 14 element (C, Si, Ge, or Sn, preferably C or Si, preferably Si), $R^{20}$ is a $C_1$ to $C_4$ hydrocarbyl (preferably methyl), and each R' is independently a $C_1$ to $C_{20}$ substituted or unsubstituted hydrocarbyl, provided that at least one R' is not H, and provided that at least one (preferably at least two, preferably two) of $R^1$, $R^2$, $R^3$, $R^4$, $R^5$, $R^6$, $R^7$, $R^8$, $R^9$ and $R^{10}$ is $-R^{20}-ER'_3$; and each X is, independently, a univalent anionic ligand, or two X are joined and bound to the metal atom to form a metallocycle ring, or two X are joined to form a chelating ligand, a diene ligand, or an alkylidene ligand, preferably each X is not F.

In a preferred embodiment of the invention, at least one of $R^6$ to $R^{10}$ and optionally at least one of $R^1$ to $R^5$ are, independently, $-R^{20}-CMe_3$, or $-R^{20}-SiMe_3$ or $-R^{20}-GeMe_3$, where $R^{20}$ is independently a methyl, ethyl, propyl, or butyl group, preferably $-CH_2-CMe_3$, or $-CH_2-SiMe_3$ or $-CH_2-GeMe_3$.

In a preferred embodiment of the invention, each $R^1$, $R^2$, $R^4$, $R^5$, $R^6$, $R^7$, $R^8$, $R^9$ and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or is $-R^{20}-SiR'_3$ or $-R^{20}-CR'_3$ where $R^{20}$ is a $C_1$ to $C_4$ hydrocarbyl (preferably methyl), and each R' is independently a $C_1$ to $C_{20}$ substituted or unsubstituted hydrocarbyl, provided that at least one R' is not H (preferably each $R^{20}$ is independently a methyl, ethyl, propyl, or butyl group, preferably $-CH_2-CMe_3$, or $-CH_2-SiMe_3$), and provided that at least one of $R^1$, $R^2$, $R^4$, $R^5$, $R^6$, $R^7$, $R^8$, $R^9$ and $R^{10}$ is $-R^{20}-SiR'_3$ or $-R^{20}-CR'_3$.

This invention relates to catalyst compounds represented by the formula (B), and catalyst systems comprising: activator, catalyst compound, and optional support wherein the catalyst compound is represented by the formula (B):

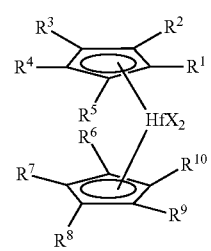

(B)

where:
each $R^1$, $R^2$, $R^4$ and $R^5$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group);

$R^3$ is independently hydrogen, alkoxide or a $C_1$ to $C_{40}$ substituted or unsubstituted hydrocarbyl group or is —$R^{20}$-$ER'_3$, where E is a group 14 element (C, Si, Ge, or Sn), $R^{20}$ is a $C_1$ to $C_4$ hydrocarbyl (preferably methyl), and each R' is independently a $C_1$ to $C_{20}$ substituted or unsubstituted hydrocarbyl, provided that at least one R' is not H;

each $R^6$, $R^7$, $R^8$, and $R^{10}$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group);

$R^9$ is —$R^{20}$-$ER'_3$, where E is a group 14 element (C, Si, Ge, or Sn), $R^{20}$ is a $C_1$ to $C_4$ hydrocarbyl (preferably $R^{20}$ is $CH_2$), and each R' is independently a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 R' are not H; and each X is, independently, a univalent anionic ligand, or two X are joined and bound to the metal atom to form a metallocycle ring, or two X are joined to form a chelating ligand, a diene ligand, or an alkylidene ligand, where X is not F, preferably X is Cl, Br, C1 to C12 alkyl or aryl, such as Cl, Br, Me, Et, Ph).

In a preferred embodiment, this invention relates to catalyst compounds and catalyst systems comprising such compounds, represented by the formula (B):

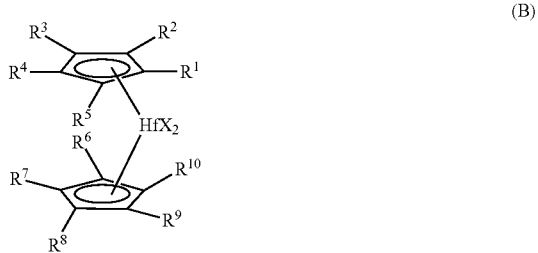

where:
each $R^1$, $R^2$, $R^4$ and $R^5$ is independently hydrogen, alkoxide, or a $C_1$ to $C_{40}$ substituted or unsubstituted hydrocarbyl group (preferably a $C_1$ to $C_{20}$ substituted or unsubstituted hydrocarbyl group);

$R^3$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group), or is —$R^{20}$—$SiR'_3$ or —$R^{20}$—$CR'_3$ where $R^{20}$ is a $C_1$ to $C_4$ hydrocarbyl (preferably $CH_2$), and each R' is independently a $C_1$ to $C_{20}$ substituted or unsubstituted hydrocarbyl, provided that at least one R' is not H;

each $R^6$, $R^7$, $R^8$, and $R^{10}$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group);

$R^9$ is —$R^{20}$-$ER'_3$, where E is a group 14 element (C, Si, Ge, or Sn), $R^{20}$ is a $C_1$ to $C_4$ hydrocarbyl (preferably $R^{20}$ is $CH_2$), and each R' is independently a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 R' are not H; and each X is, independently, a univalent anionic ligand, or two X are joined and bound to the metal atom to form a metallocycle ring, or two X are joined to form a chelating ligand, a diene ligand, or an alkylidene ligand, where X is not F (preferably X is Cl, Br or $C_1$ to $C_{12}$ alkyl or aryl, such as Br, Cl, Me, Et, Ph).

In a preferred embodiment of the invention, each $R^1$, $R^2$, $R^4$ and $R^5$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, each $R^3$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or $R^3$, is —$R^{20}$-$ER'_3$, where E is a group 14 element (C, Si, Ge, or Sn), $R^{20}$ is a $C_1$ to $C_4$ hydrocarbyl (preferably methyl, ethyl, propyl, butyl), and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

In a preferred embodiment of the invention, each $R^6$, $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, $R^9$, is —$R^{20}$-$ER'_3$, where E is a group 14 element (C, Si, Ge, or Sn), $R^{20}$ is a $C_1$ to $C_4$ hydrocarbyl (preferably methyl, ethyl, propyl, butyl), and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Alternately, $R^9$ and optionally $R^3$ are, independently, —$R^{20}$—$CMe_3$, or —$R^{20}$—$SiMe_3$ or —$R^{20}$—$GeMe_3$, where $R^{20}$ is a $C_1$ to $C_4$ hydrocarbyl (preferably methyl, ethyl, propyl, butyl), preferably —$CH_2$—$CMe_3$, or —$CH_2$—$SiMe_3$ or —$CH_2$—$GeMe_3$.

Alternately, each X may be, independently, a non-flourine halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from non-flourine halides, aryls and $C_1$ to $C_5$ alkyl groups, preferably each X is a phenyl, methyl, ethyl, propyl, butyl, pentyl, bromo, or chloro group.

In a preferred embodiment of any formula described herein, $R^{20}$ is $CH_2$.

In a preferred embodiment of any formula described herein, $R^{20}$ is $CH_2$ and each X is independently Br, Cl, methyl, ethyl, propyl, butyl, pentyl, hexyl, or phenyl.

Catalyst compounds that are particularly useful in this invention include one or more of: $(Me_3SiCH_2Cp)_2HfCl_2$; $(Me_3SiCH_2Cp)_2HfMe_2$; $(Cp)(Me_3SiCH_2Cp)HfCl_2$; $(Cp)(Me_3SiCH_2Cp)HfMe_2$; $(PrCp)(Me_3SiCH_2Cp)HfCl_2$; $(PrCp)(Me_3SiCH_2Cp)HfMe_2$; $(MeCp)(Me_3SiCH_2Cp)HfCl_2$; $(MeCp)(Me_3SiCH_2Cp)HfMe_2$; $(EtCp)(Me_3SiCH_2Cp)HfCl_2$; $(EtCp)(Me_3SiCH_2Cp)HfMe_2$; $(1,3-Me_2Cp)(Me_3SiCH_2Cp)HfCl_2$; $(1,3-Me_2Cp)(Me_3SiCH_2Cp)HfMe_2$; $(1,2,4-Me_3Cp)(Me_3SiCH_2Cp)HfCl_2$; $(1,2,4-Me_3Cp)$ (Me₃SiCH₂Cp)HfMe₂; (Me₄Cp)(Me₃SiCH₂Cp)HfCl₂; (Me₄Cp)(Me₃SiCH₂Cp)HfMe₂; (Me₃Cp)(Me₃SiCH₂Cp)HfCl₂ and (Me₃Cp)(Me₃SiCH₂Cp)HfMe₂.

In a preferred embodiment in any of the processes described herein, one catalyst compound is used, e.g., the catalyst compounds are not different. For purposes of this invention one catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by ¹H or ¹³C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an X ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds

The catalyst compounds described herein may generally be prepared as illustrated in the following scheme 1 showing a general synthetic route for symmetrical and unsymmetrical unbridged metallocenes.

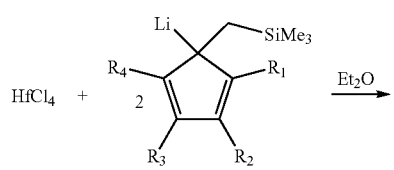

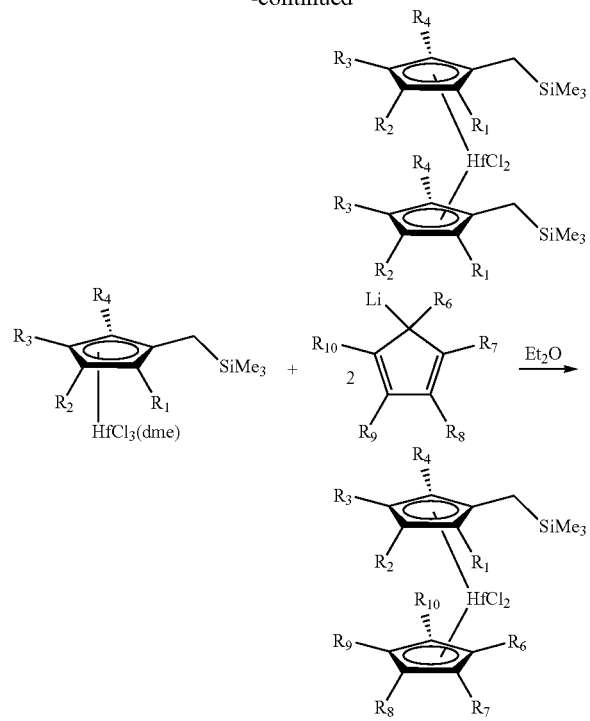

The symmetrical catalyst compounds may be prepared by reacting two equivalents of the substituted cyclopentadienyl anion with hafnium tetrachloride in a suitable medium (such as an ether or hydrocarbon), separating the product by extraction into an appropriate solvent, and removing the solvent to obtain the hafnocenes dichloride. The unsymmetrical catalyst compounds may be prepared by reacting a substituted cyclopentadienylhafnium trichloride complex with a substituted cyclopentadienyl anion in a suitable medium (such as an ether), separating the product by extraction into an appropriate solvent, and removing the solvent to obtain the hafnocenes dichloride. The requisite substituted cyclopentadienylhafnium trichloride complex may be prepared as by Lund, Eric C and Livinghouse, Tom, *Organometallics*, 1990, 9, 2426.

Activators

The catalyst systems described herein typically comprises a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methyl-alumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Ionizine/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic. It is also within the scope of this invention to use neutral or ionic activators alone or in combination with alumoxane or modified alumoxane activators. For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl)pyrrolidinium, tetrakis(pentafluorophenyl) borate, and 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

In an embodiment the, activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3, preferably Z is (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 (the disclosures of which are incorporated herein by reference in their entirety) which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. Preferably, the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 mun. More preferably, the surface area of the support material is in the range of from about 50 to about 500 $m^2$/g, pore volume of from about 0.5 to about 3.5 cc/g and average particle size of from about 10 to about 200 µm. Most preferably, the surface area of the support material is in the range is from about 100 to about 400 $m^2$/g, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON 952 or DAVISON 955 by the Davison Chemical Division of W.R. Grace and Company. In other embodiments, DAVISON 948 is used.

In an embodiment, the support material is not fluorided, i.e. does not contain fluorine.

In an embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately 0.19 to 19 wt %, alternately from 0.6 to 3.5 wt %, based upon the weight of the support.

The above catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used, and, typically, the total amount of solid catalyst complex does not exceed the support's pore volume.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In an alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as propylene), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymerization produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode.

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 29, 2000, 4627. A homogeneous polymerization process is preferably a process where at least 90 wt % of the product is soluble in the reaction media. Solution polymerization processes and homogeneous polymerization processes are useful herein.

A bulk homogeneous polymerization process may also be used herein. A bulk polymerization is a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %. A bulk process is preferably a process where monomer concentration in all feeds to the reactor is 70 vol % or more. Alternately, no solvent or diluent is present or added in the reaction medium, (except for the small amounts used as the carrier for the catalyst system or other additives, or amounts typically found with the monomer, e.g., propane in propylene).

A slurry polymerization process may also be used. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent). A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalyst system as described herein, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed is typically liquid under the conditions of polymerization and relatively inert. When a propane medium is used, the process is often operated above the reaction diluent critical temperature and pressure. Preferably, a hexane or an isobutane medium is employed. Preferably, the olefins and catalyst system are contacted in a slurry loop reactor.

A gas polymerization process may also be used. As used herein the term "gas phase polymerization process" preferably means a polymerization process where a gaseous stream containing one or more monomers is continuously cycled through a fluidized bed in the presence of a catalyst system under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably, the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa, preferably in the absence of fluorine.

Preferred polymerizations are run in the absence of fluorine.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In embodiments of the invention, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as, isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably aromatics are present in the solvent at less than 1 wt %, preferably less than 0.5 wt %, preferably at 0 wt % based upon the weight of the solvents); 4) wherein the catalyst system used in the polymerization may comprise less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally, scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)) 9) the polymerization is preferably run in the absence of fluorine. In a preferred embodiment, the catalyst system used in the polymerization comprises no more than one catalyst compound. A "reaction zone" also referred to as a "polymerization zone" is a vessel where polymerization takes place; for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain Transfer Agents

Chain transfer agents useful herein are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Activity

In useful embodiments of the invention, the catalyst has an activity greater than 20,000 grams of polymer per gram of supported catalyst, wherein the Zr wt % on the support is between 0.1 and 0.5 wt %, based upon the weight of the catalyst and the support, and the Mw of the polymer produced is less than 100,000 g/mol (preferably from 10,000 to less than 100,000 g/mol), preferably the polymer produced comprises at least 50 mol % ethylene, preferably the polymer comprises hexene and at least 50 mol % ethylene.

In useful embodiments of the invention, the catalyst has an activity greater than 20,000 grams of polymer per gram of supported catalyst, wherein the Hf wt % on the support is between 0.1 and 0.5 wt %, based upon the weight of the catalyst and the support, and the Mw of the polymer produced is less than 100,000 g/mol (preferably from 10,000 to less than 100,000 g/mol), preferably the polymer produced comprises at least 50 mol % ethylene, preferably the polymer comprises hexene and at least 50 mol % ethylene.

Polyolefin Products

This invention also relates to compositions of matter produced by the methods described herein.

In a preferred embodiment, the process described herein produces ethylene homopolymers or ethylene copolymers, such as ethylene-alphaolefin (preferably, $C_3$ to $C_{20}$) copolymers (such as, ethylene-hexene copolymers or ethylene-octene copolymers) having: a Mw/Mn of greater than 1 to 6 (preferably, greater than 1 to 3).

Likewise, the process of this invention produces olefin polymers, preferably polyethylene and polypropylene homopolymers and copolymers. In a preferred embodiment, the polymers produced herein are homopolymers of ethylene or propylene, are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 to 15 mol % hexene, alternately 1 to 10 mol %.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment, the polymer produced herein has a unimodal or multimodal molecular weight distribution as determined by Gel Permeation Chromatography (GPC). By "unimodal" is meant that the GPC trace has one peak or two or more inflection points. By "multimodal" is meant that the GPC trace has at least two peaks or more than 2 inflection points. An inflection point is that point where the second derivative of the curve changes in sign (e.g., from negative to positive or vice versa).

Polymers produced by the processes of this invention also have a g'(vis) of greater than 0.95 (preferably greater than 0.96, preferably greater than 0.98, preferably greater than 0.99, and, optionally, preferably less than or equal to 1.0).

Unless otherwise indicated Mw, Mn, MWD, and g'(vis) are determined by the GPC method described in the experimental section below.

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

The polymer produced herein contains less than 100 ppm of fluorine, preferably less than 50 ppm fluorine, preferably less than 20 ppm of fluorine, preferably less than 10 ppm of fluorine.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Any of the foregoing polymers, such as the foregoing ethylene polymers and/or propylene polymers, or any blends thereof, may be used in a variety of end-use applications. Such applications include, for example, mono- or multilayer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Experimental

All molecular weights are weight average unless otherwise noted. All molecular weights are reported in g/mol unless otherwise noted.

Melt index (MI) also referred to as I2, reported in g/10 min, is determined according to ASTM D1238, 190° C., 2.16 kg load.

High load melt index (HLMI) also referred to as I21, reported in g/10 min, is determined according to ASTM D1238, 190° C., 21.6 kg load.

Melt index ratio (MIR) is MI divided by HLMI as determined by ASTM D1238.

$^1$H NMR $^1$H NMR data is collected at 120° C. using a 10 mm CryoProbe with a Bruker spectrometer at a $^1$H frequency of 400 MHz (available from Bruker Corporation, United Kingdom). Data are recorded using a maximum pulse width of 45°, 5 seconds between pulses and signal averaging 512 transients. Samples are prepared by dissolving 80 mg of sample in 3 mL of solvent heated at 140° C. Peak assignments are determined referencing the solvent of tetrachloroethane-1,2 d$_2$ at 5.98 ppm.

Molecular Weight. Comonomer Composition and Long Chain Branching Determination by Polymer Char GPC-IR Hyphenated with Multiple Detectors (GPC-4D) Unless otherwise indicated, the distribution and the moments of molecular weight (Mw, Mn, Mz, Mw/Mn, etc.), the comonomer content (C2, C3, C6, etc.) and the branching index (g'(vis)) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant determined with PE or PP standards. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}=0.67$ and $K_{PS}=-0.000175$ while $\alpha$ and K are for other materials as calculated and published in literature (Sun, T. et al. *Macromolecules*, 2001, 34, 6812), except that for purposes of this invention and the claims thereto, $\alpha$ and K are 0.695 and 0.000579, respectively, for ethylene polymers; $\alpha$ and K are 0.705 and 0.0002288, respectively, for propylene polymers; and $\alpha$ and K are 0.695 and 0.000579*(1-0.0075*wt % hexene comonomer), respectively, for ethylene-hexene copolymer.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$-0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_v$ is the viscosity-average molecular weight based on molecular weights determined by LS analysis and the K and $\alpha$ are for the reference linear polymer, which, for purposes of this invention and claims thereto, $\alpha$=0.705 and K=0.000262 for linear propylene polymers, $\alpha$=0.695 and K=-0.000181 for linear butene polymers, $\alpha$=0.695 and K=-0.000579 for linear ethylene polymers, except that $\alpha$ is 0.695 and K is 0.000579*(1-0.0087*w2+0.000018*(w2)^2) for ethylene-butene copolymer where w2 is weight percent butene comonomer, $\alpha$ is 0.695 and K is 0.000579*(1-0.0075*w2) for ethylene-hexene copolymer where w2 is weight percent hexene comonomer, and $\alpha$ is 0.695 and K is 0.000579*(1-0.0077*w2) for ethylene-octene copolymer where w2 is weight percent octene comonomer. Concentrations are expressed in g/cm$^3$, molecular weight is expressed in g/mole, and intrinsic viscosity (hence K in the Mark-Houwink equation) is expressed in dL/g unless otherwise noted.

Experimental

All manipulations were done in a nitrogen purged glove box unless stated otherwise. Anhydrous solvents were purchased from Aldrich and purged with nitrogen prior to use. 30 wt % methylalumoxane (MAO) in toluene was purchased from Albemarle. Tri-n-octylaluminum was purchased from Akzo Nobel. Ethylene containing 300 ppm hydrogen used in the polymerizations was purchased from Air Liquide and used without purification. Isobutane and nitrogen used in the polymerizations were treated with 3A sieves and a supported copper catalyst prior to use to remove water and oxygen. Deuterated solvents were purchased from Cambridge Isotope Laboratories and dried over 3A molecular sieves and purged with nitrogen prior to use. $^1$H NMR spectra were obtained as described above.

Preparation of Complex 1-bis(trimethylsilylmethylcyclopentadienyl)hafnium dichloride [(Me$_3$SiCH$_2$Cp)$_2$HfCl$_2$]

To a white suspension of hafnium tetrachloride bis(diethylether) (2.50 g, 5.38 mmol, 1.00 eq.) in ether (25 mL) was added lithium (trimethylsilylmethylcyclopentadienide) (1.70 g, 10.7 mmol, 2.00 eq.) to give a cloudy white mixture. The mixture was stirred 21 hours, then evaporated under vacuum to leave white solid. The solid was extracted with dichloromethane (2×20 mL) and the mixture filtered to give a pale amber solution and white solid. The solution was evaporated under vacuum, leaving white solid. The solid was washed with pentane (2×10 mL) and dried under vacuum. Yield 2.52 g (85%) white powder. $^1$H NMR (CD$_2$Cl$_2$): δ 6.16 (t, 4H), 5.87 (t, 4H), 2.08 (s, 4H), 0.03 (s, 18H).

Preparation of Complex 2-cyclopentadienyl (trimethlsilylmethylcyclopentadienyl) hafnium dichloride [Cp(Me$_3$SiCH$_2$Cp)HfCl$_2$]

To a pink-gray suspension of cyclopentadienylhafnium trichloride (dimethoxyethane) (2.50 g, 5.68 mmol, 1.00 eq.)

in ether (25 mL) was added lithium (trimethylsilylmethylcyclopentadienide) (0.90 g, 5.69 mmol, 1.00 eq.) to give a thick, white mixture. The mixture was stirred 16 hours, then evaporated under vacuum to leave white solid. The solid was extracted with dichloromethane (30 mL, then 3×5 mL) and the mixture filtered to give a pale amber solution and white solid. The solution was evaporated under vacuum, leaving white solid. The solid was washed with pentane (20 mL) and dried under vacuum. Yield 2.40 g (97%) white powder. $^1$H NMR (CD$_2$Cl$_2$): δ 6.36 (s, 5H), 6.20 (t, 2H), 5.89 (t, 2H), 2.09 (s, 2H), −0.02 (s, 9H).

Preparation of Complex 3-(propylcyclopentadienyl)(trimethylsilylmethylcyclopentadienyl) hafnium dichloride [(PrCp)(Me$_3$SiCH$_2$Cp)HfCl$_2$]

To a creamy-white suspension of (propylcyclopentadienylhafnium trichloride (dimethoxyethane) (2.49 g, 5.16 mmol, 1.00 eq.) in ether (25 mL) was added lithium (trimethylsilylmethylcyclopentadienide) (0.82 g, 5.18 mmol, 1.00 eq.) to give a manila mixture. The mixture was stirred 18 hours, then evaporated under vacuum to leave manila solid. The solid was extracted with dichloromethane (30 mL, then 3×5 mL) and the mixture filtered to give a pale green solution and gray solid. The solution was evaporated under vacuum, leaving manila solid. The solid was washed with pentane (10 mL) and dried under vacuum. Yield 2.44 g (93%) light manila powder. $^1$H NMR (CD$_2$Cl$_2$): δ 6.20 (t, 2H), 6.17 (t, 2H), 6.09 (t, 2H), 5.87 (t, 2H), 2.60 (t, 2H), 2.01 (s, 2H), 1.57, (m, 2H), 0.92 (t, 3H), −0.02 (s, 9H).

Preparation of Complex 4-(pentamethylcyclopentadienyl) (trimethylsilylmethylcyclopentadienyl) hafnium dichloride [(Me$_5$Cp)(Me$_3$SiCH$_2$Cp)HfCl$_2$]

To a pale white-violet suspension of (pentamethylcyclopentadienyl)hafnium trichloride (dimethoxyethane) (2.50 g, 4.90 mmol, 1.00 eq.) in ether (25 mL) was added lithium (trimethylsilylmethylcyclopentadienide) (0.78 g, 4.93 mmol, 1.00 eq.) to give a cloudy white mixture. The mixture was stirred 18 hours, then evaporated under vacuum to leave white solid. The solid was extracted with dichloromethane (30 mL, then 4×5 mL) and the mixture filtered to give a pale amber solution and white solid. The solution was evaporated under vacuum, leaving white solid. The solid was washed with pentane (20 mL) and dried under vacuum. Yield 2.12 g (81%) white powder. $^1$H NMR (CD$_2$Cl$_2$): δ 5.88 (t, 2H), 5.72 (t, 2H), 2.05 (s, 17H), −0.03 (s, 9H).

Preparation of Complex 5-(tetramethylcyclopentadienyl)(trimethylsilylmethylcyclopentadienyl) hafnium dichloride [(Me$_4$Cp)(Me$_3$SiCH$_2$Cp)HfCl$_2$]

To a pale violet suspension of (tetramethylcyclopentadienyl)hafnium trichloride (dimethoxyethane) (2.50 g, 5.04 mmol, 1.00 eq.) in ether (25 mL) was added lithium (trimethylsilylmethylcyclopentadienide) (0.80 g, 5.06 mmol, 1.00 eq.) to give a cloudy manila mixture. The mixture was stirred 16 hours, then evaporated under vacuum to leave off-white solid. The solid was extracted with dichloromethane (30 mL, then 4×5 mL) and the mixture filtered to give a pale violet solution and pink solid. The solution was evaporated under vacuum, leaving pale pink solid. The solid was washed with pentane (20 mL) and dried under vacuum. Yield 2.12 g (81%) pale pink powder. $^1$H NMR (CD$_2$Cl$_2$): δ 6.04 (t, 2H), 5.83 (s, 1H), 5.22 (t, 2H), 2.06 (s, 6H), 2.02 (s, 6H), −0.02 (s, 9H).

Preparation of Supported Complex 1 (Me$_3$SiCH$_2$Cp)$_2$HfCl$_2$ 30 wt % MAO in toluene (6.26 g, 32.4 mmol, 120 eq.) and 6.50 g toluene were combined to give a colorless solution. The solution was stirred 15 minutes, then bis(trimethylsilylmethylcyclopentadienyl)hafnium dichloride (0.149 g, 0.2 mmol, 1.00 eq.) was added to give a colorless solution. The reaction was stirred 15 minutes, then Davison 948 silica (5.00 g, dried at 600° C.) was added to give a warm, white mixture. The mixture was stirred 10 minutes with a spatula, then dried 23 hours under vacuum. Yield 6.93 g (99%) white solid. Complexes 2, 3, 4 and 5 were supported using the same general procedure.

Preparation of Complex 6-bis-(trimethylsilylmethylcyclopentadienyl)hafnium dimethyl, [(Me$_3$SiCH$_2$Cp)$_2$HfMe$_2$]

An ethereal solution of MeLi (2.56 mL, 4.1 mmol) was added drop wise to a precooled diethyl ether solution of (Me$_3$SiCH$_2$Cp)$_2$HfCl$_2$ (1.12 g, 2.03 mmol) over a period of 3-5 minutes at −25° C. The resulting mixture was stirred overnight at room temperature to ensure completion of the reaction. Insoluble materials were filtered through a pad of celite. Volatiles from the filtrate were removed under vacuum. The crude materials were triturated with pentane and then extracted into pentane, followed by solvent removal afforded a colorless crystalline material of (Me$_3$SiCH$_2$Cp)$_2$HfMe$_2$ in 875 mg (84.2%) yield. $^1$H NMR (400 MHz, C$_6$D$_6$): δ−0.23 (6H, s, Hf—CH$_3$), 0.02 (18H, s, SiMe$_3$-CH$_3$), 1.89 (4H, s, Me$_3$Si—CH$_2$), 5.54-5.48 (8H, m, Cp-CH) ppm.

Preparation of Complex 7-cyclopentadienyl(trimethylsilyl methylcyclopentadienyl) hafnium dimethyl, [Cp(Me$_3$SiCH$_2$Cp)HfMe$_2$]

An ethereal solution of MeLi (14.1 mL, 22.6 mmol) was added drop wise to a precooled diethyl ether solution of (Cp)(Me$_3$SiCH$_2$Cp)HfCl$_2$ (5.2 g, 11.2 mmol) over a period of 10-15 minutes at −25° C. The resulting mixture was stirred overnight at room temperature to ensure completion of the reaction. Insoluble materials were filtered through a pad of celite. Volatiles from the filtrate were removed under vacuum. The crude materials were triturated with pentane and then extracted into pentane, followed by solvent removal afforded a colorless crystalline material of (Cp)(Me$_3$SiCH$_2$Cp)HfMe$_2$ in 4.7 g (98.7%) yield. $^1$H NMR (400 MHz, C$_6$D$_6$): δ−0.27 (6H, s, Hf—CH$_3$), −0.01 (9H, s, SiMe$_3$-CH$_3$), 1.79 (2H, s, Me$_3$Si—CH$_2$), 5.44-5.39 (4H, m, Cp-CH), 5.73 (5H, s, Cp-CH) ppm.

Slurry Polymerizations.

Polymerizations were carried out in a 1 L Autoclave Engineers Zipperclave jacketed reactor equipped with a stirrer and baffle, and connected to supplies of ethylene, isobutane, and nitrogen. 30 mL 1-hexene and 50 μL trioctylaluminum were injected into the reactor from a transfer cylinder, and 400 mL isobutane was then added to the reactor. The reactor was heated to 80° C. and the solution was saturated with ethylene containing 300 ppm hydrogen at 180 psi over the reactor pressure at 80° C. 25 mg supported catalyst was injected into the reactor as a slurry in 2 mL pentane using ethylene containing 300 ppm hydrogen at 200 psi over the reactor pressure at 80° C. The polymerization was run 40 minutes at 80° C., feeding ethylene with 300 ppm hydrogen on demand at 200 psi over the reactor pressure at 80° C. The reactor was then vented and cooled. The polyethylene was collected and dried at 60° C. overnight in a vacuum oven. Productivity data are presented in Table A.

TABLE A

| Example Supported Complex | Productivity (g/g hour) |
|---|---|
| Supported Complex 1 | 2188 |
| Supported Complex 2 | 1742 |
| Supported Complex 3 | 1125 |
| Supported Complex 4 | 1714 |
| Supported Complex 5 | 1384 |
| Comparative Supported catalysts | |
| $(PrCp)_2HfCl_2$* | 1423 |
| $Cp(PrCp)HfCl2$* | 520 |
| $(Me_5Cp)(PrCp)HfCl_2$* | 597 |
| $(PrCp)(Me_4Cp)HfCl_2$* | 1170 |

*supported on Silica (Davison™ 948) according to the same general procedure as used for supported Complex 1.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A catalyst compound represented by the formula (B):

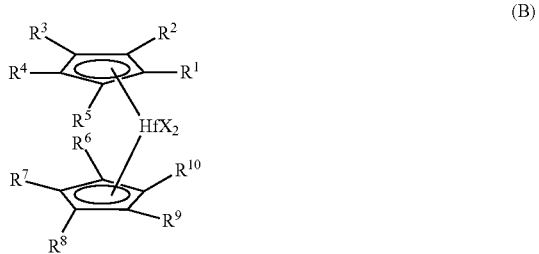

(B)

where:
each $R^1$, $R^2$, $R^3$, $R^4$, $R^5$, $R^6$, $R^7$, $R^8$, $R^9$ and $R^{10}$ is, independently, hydrogen, alkoxide, a $C_1$ to $C_{40}$ substituted or unsubstituted hydrocarbyl group or is —$R^{20}$—$SiR'_3$ or —$R^{20}$—$CR'_3$ where $R^{20}$ is a $C_1$ to $C_4$ hydrocarbyl, and each R' is independently a $C_1$ to $C_{20}$ substituted or unsubstituted hydrocarbyl, provided that at least one R' is not H, and provided that at least one of $R^1$, $R^2$, $R^4$, $R^5$, $R^6$, $R^7$, $R^8$, $R^9$ and $R^{10}$ is —$R^{20}$—$SiR'_3$ or —$R^{20}$—$CR'_3$; and
each X is, independently, a univalent anionic ligand, or two X are joined and bound to the metal atom to form a metallocycle ring, or two X are joined to form a chelating ligand, a diene ligand, or an alkylidene ligand, provided that X is not fluorine.

2. The catalyst compound of claim 1, wherein each $R^1$, $R^2$, $R^4$ and $R^5$ is independently hydrogen, alkoxide or a $C_1$ to $C_{40}$ substituted or unsubstituted hydrocarbyl group;
$R^3$ is independently hydrogen, alkoxide or a $C_1$ to $C_{40}$ substituted or unsubstituted hydrocarbyl group or is —$R^{20}$—$SiR'_3$ or —$R^{20}$—$CR'_3$ where $R^{20}$ is $CH_2$, and each R' is independently a $C_1$ to $C_{20}$ substituted or unsubstituted hydrocarbyl, provided that at least one R' is not H;
each $R^6$, $R^7$, $R^8$, and $R^{10}$ is independently hydrogen, alkoxide or a $C_1$ to $C_{40}$ substituted or unsubstituted hydrocarbyl group;
$R^9$ is —$R^{20}$—$SiR'_3$ or —$R^{20}$—$CR'_3$ where $R^{20}$ is $CH_2$, and each R' is independently a $C_1$ to $C_{20}$ substituted or unsubstituted hydrocarbyl, provided that at least one R' is not H.

3. The catalyst compound of claim 1, wherein $R^9$ and $R^3$ are, independently, —$R^{20}$—$SiR'_3$ or —$R^{20}$—$CR'_3$ where $R^{20}$ is a $C_1$ to $C_4$ hydrocarbyl, and each R' is independently a $C_1$ to $C_{20}$ substituted or unsubstituted hydrocarbyl, provided that at least one R' is not H.

4. The catalyst compound of claim 1, wherein each X is independently selected from non-fluorine halides, aryls and $C_1$ to $C_5$ alkyl groups.

5. The catalyst compound of claim 1, wherein each $R^1$, $R^2$, $R^4$, $R^5$, $R^6$, $R^7$, $R^8$, $R^9$ and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or is —$R^{20}$—$SiR'_3$ or —$R^{20}$—$CR'_3$ where $R^{20}$ is independently a methyl, ethyl, propyl, or butyl group, and provided that at least one of $R^1$, $R^2$, $R^4$, $R^5$, $R^6$, $R^7$, $R^8$, $R^9$ and $R^{10}$ is —$R^{20}$—$SiR'_3$ or —$R^{20}$—$CR'_3$.

6. The catalyst compound of claim 1, wherein at least one of $R^6$ to $R^{10}$ and optionally at least one of $R^1$ to $R^5$ are, independently, —$R^{20}$—$CMe_3$, or —$R^{20}$—$SiMe_3$ where $R^{20}$ is independently a methyl, ethyl, propyl, or butyl group.

7. A catalyst system comprising activator and the catalyst of claim 1.

8. The catalyst system of claim 7, wherein the activator comprises alumoxane and/or non-coordinating anion.

9. The catalyst system of claim 7, wherein the catalyst system further comprises a support.

10. A process to polymerize olefins comprising contacting one or more olefins with the catalyst system of claim 7.

11. The process of claim 10, wherein the olefins and catalyst system are contacted in the gas phase.

12. The process of claim 10, wherein the olefins and catalyst system are contacted in the slurry phase.

13. The process of claim 10, wherein the olefins and catalyst system are contacted in the solution phase.

14. The process of claim 10, wherein the olefins and catalyst system are contacted in a slurry loop reactor.

15. The process of claim 10, wherein the polymerization is a continuous process.

16. The process of claim 10, wherein the catalyst compound comprises one or more of: $(Me_3SiCH_2Cp)_2HfCl_2$; $(Me_3SiCH_2Cp)_2HfMe_2$; $(Cp)(Me_3SiCH_2Cp)HfCl_2$; $(Cp)(Me_3SiCH_2Cp)HfMe_2$; $(PrCp)(Me_3SiCH_2Cp)HfCl_2$; $(Me_4Cp)(Me_3SiCH_2Cp)HfCl_2$; and $(Me_5Cp)(Me_3SiCH_2Cp)HfCl_2$.

17. The process of claim 10, wherein the activator comprises alumoxane.

18. The process of claim 10, wherein the olefins comprise ethylene and optionally one more C3 to C20 alpha olefins.

19. The process of claim 10, wherein the activator comprises a non-coordinating anion activator.

20. The process of claim 10, wherein activator is represented by the formula:

$$(Z)_d^+ (A^{d-})$$

wherein Z is (L-H) or a reducible Lewis Acid, L is an neutral Lewis base; H is hydrogen; (L-H)$^+$ is a Brønsted acid; $A^{d-}$ is a non-coordinating anion having the charge d–; and d is an integer from 1 to 3.

21. The process of claim 10, wherein activator is represented by the formula:

$$(Z)_d^+ (A^{d-})$$

wherein $A^{d-}$ is a non-coordinating anion having the charge d–; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

22. The process of claim 10, wherein the activator is one or more of:
N,N-dimethylanilinium tetrakis(pentafluorophenyl)borate, triphenylcarbenium tetrakis(pentafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, and triphenylcarbenium tetrakis(perfluoronaphthyl)borate.

23. The process claim 10, wherein the process occurs at a temperature of from about 0° C. to about 300° C., at a pressure in the range of from about 0.35 MPa to about 10 MPa, and at a time up to 300 minutes in the absence of fluorine.

24. The catalyst system of claim 7, wherein each $R^1$, $R^2$, $R^4$ and $R^5$ is independently hydrogen, alkoxide or a $C_1$ to $C_{40}$ substituted or unsubstituted hydrocarbyl group;

$R^3$ is independently hydrogen, alkoxide or a $C_1$ to $C_{40}$ substituted or unsubstituted hydrocarbyl group or is —$R^{20}$—SiR'$_3$ or —$R^{20}$—CR'$_3$ where $R^{20}$ is CH$_2$, and each R' is independently a $C_1$ to $C_{20}$ substituted or unsubstituted hydrocarbyl, provided that at least one R' is not H;

each $R^6$, $R^7$, $R^8$, and $R^{10}$ is independently hydrogen, alkoxide or a $C_1$ to $C_{40}$ substituted or unsubstituted hydrocarbyl group;

$R^9$ is —$R^{20}$—SiR'$_3$ or —$R^{20}$—CR'$_3$ where $R^{20}$ is CH$_2$, and each R' is independently a $C_1$ to $C_{20}$ substituted or unsubstituted hydrocarbyl, provided that at least one R' is not H.

25. The catalyst system of claim 7, wherein $R^9$ and $R^3$ are, independently, —$R^{20}$—SiR'3 or —$R^{20}$—CR'$_3$ where $R^{20}$ is a $C_1$ to $C_4$ hydrocarbyl, and each R' is independently a $C_1$ to $C_{20}$ substituted or unsubstituted hydrocarbyl, provided that at least one R' is not H.

26. The catalyst system of claim 7, wherein each X is independently selected from non-fluorine halides, aryls and $C_1$ to $C_5$ alkyl groups.

27. The catalyst system of claim 7, wherein each $R^1$, $R^2$, $R^4$, $R^5$, $R^6$, $R^7$, $R^8$, $R^9$ and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or is —$R^{20}$—SiR'$_3$ or —$R^{20}$—CR'$_3$ where $R^{20}$ is independently a methyl, ethyl, propyl, or butyl group, and provided that at least one of $R^1$, $R^2$, $R^4$, $R^5$, $R^6$, $R^7$, $R^8$, $R^9$ and $R^{10}$ is —$R^{20}$—SiR'$_3$ or —$R^{20}$—CR'$_3$.

28. The catalyst system of claim 7, wherein at least one of $R^6$ to $R^{10}$ and optionally at least one of $R^1$ to $R^5$ are, independently, —$R^{20}$—CMe$_3$, or —$R^{20}$—SiMe$_3$ where $R^{20}$ is independently a methyl, ethyl, propyl, or butyl group.

29. The process of claim 10, wherein each $R^1$, $R^2$, $R^4$ and $R^5$ is independently hydrogen, alkoxide or a $C_1$ to $C_{40}$ substituted or unsubstituted hydrocarbyl group;

$R^3$ is independently hydrogen, alkoxide or a $C_1$ to $C_{40}$ substituted or unsubstituted hydrocarbyl group or is —$R^{20}$—SiR'$_3$ or —$R^{20}$—CR'$_3$ where $R^{20}$ is CH$_2$, and each R' is independently a $C_1$ to $C_{20}$ substituted or unsubstituted hydrocarbyl, provided that at least one R' is not H;

each $R^6$, $R^7$, $R^8$, and $R^{10}$ is independently hydrogen, alkoxide or a $C_1$ to $C_{40}$ substituted or unsubstituted hydrocarbyl group;

$R^9$ is —$R^{20}$—SiR'$_3$ or —$R^{20}$—CR'$_3$ where $R^{20}$ is CH$_2$, and each R' is independently a $C_1$ to $C_{20}$ substituted or unsubstituted hydrocarbyl, provided that at least one R' is not H.

30. The process of claim 10, wherein $R^9$ and $R^3$ are, independently, —$R^{20}$—SiR'$_3$ or —$R^{20}$—CR'$_3$ where $R^{20}$ is a $C_1$ to $C_4$ hydrocarbyl, and each R' is independently a $C_1$ to $C_{20}$ substituted or unsubstituted hydrocarbyl, provided that at least one R' is not H.

31. The process of claim 10, wherein each X is independently selected from non-fluorine halides, aryls and $C_1$ to $C_5$ alkyl groups.

32. The process of claim 10, wherein each $R^1$, $R^2$, $R^4$, $R^5$, $R^6$, $R^7$, $R^8$, $R^9$ and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or is —$R^{20}$—SiR'$_3$ or —$R^{20}$—CR'$_3$ where $R^{20}$ is independently a methyl, ethyl, propyl, or butyl group, and provided that at least one of $R^1$, $R^2$, $R^4$, $R^5$, $R^6$, $R^7$, $R^8$, $R^9$ and $R^{10}$ is —$R^{20}$—SiR'$_3$ or —$R^{20}$—CR'$_3$.

33. The process of claim 10, wherein at least one of $R^6$ to $R^{10}$ and optionally at least one of $R^1$ to $R^5$ are, independently, —$R^{20}$—CMe$_3$, or —$R^{20}$—SiMe$_3$ where $R^{20}$ is independently a methyl, ethyl, propyl, or butyl group.

* * * * *